United States Patent
Sugiyama

(10) Patent No.: US 12,066,737 B2
(45) Date of Patent: Aug. 20, 2024

(54) OPTICAL DEVICE AND OPTICAL TRANSCEIVER

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 7 days.

(21) Appl. No.: 17/591,395

(22) Filed: Feb. 2, 2022

(65) Prior Publication Data

US 2022/0291567 A1    Sep. 15, 2022

(30) Foreign Application Priority Data

Mar. 11, 2021  (JP) ................. 2021-039733

(51) Int. Cl.
  *G02F 1/225*  (2006.01)
  *G02F 1/01*   (2006.01)
  *G02F 1/21*   (2006.01)
  *H04B 10/40*  (2013.01)

(52) U.S. Cl.
  CPC .......... *G02F 1/2255* (2013.01); *G02F 1/0147* (2013.01); *G02F 1/212* (2021.01); *H04B 10/40* (2013.01)

(58) Field of Classification Search
  CPC ........ G02F 1/2255; G02F 1/212; G02F 1/035; G02F 1/0147; G02F 1/0081; G02F 1/0305; G02F 1/0338; G02F 2201/07; H04B 10/40; H04B 10/25759
  See application file for complete search history.

(56) References Cited

U.S. PATENT DOCUMENTS

| 8,467,635 B2  | 6/2013 | Doi et al. |
| 10,203,583 B2 | 2/2019 | Iwatsuka et al. |
| 10,649,244 B1* | 5/2020 | Mentovich ............ G02F 1/017 |

(Continued)

FOREIGN PATENT DOCUMENTS

| JP | 2009-204753 A | 9/2009 |
| JP | 2012-078375 A | 4/2012 |

(Continued)

OTHER PUBLICATIONS

Japanese Office Action issued in counterpart Japanese Application No. 2021-039733 on May 7, 2024.

*Primary Examiner* — Michael P Mooney
(74) *Attorney, Agent, or Firm* — STAAS & HALSEY LLP

(57) ABSTRACT

An optical device includes a substrate W, a RF modulating unit, and a phase adjustment unit 220. The RF modulating unit is provided on the substrate W and modulates light in accordance with a RF signal. The phase adjustment unit 220 is provided on the substrate W and adjusts the phase of an optical signal modulated by the RF modulating unit. The phase adjustment unit 220 includes a heater 2200 and a to-be-heated optical waveguide 2201. The to-be-heated optical waveguide 2201 is provided between a thin film LN substrate 32 and a buffer layer 33 of the substrate W, and is formed of a material having a thermo-optical effect. The heater 2200 is provided at a position opposite the to-be-heated optical waveguide 2201, with the buffer layer 33 therebetween on the substrate W, and heats the to-be-heated optical waveguide 2201.

11 Claims, 11 Drawing Sheets

(56) References Cited

U.S. PATENT DOCUMENTS

| | | | |
|---|---|---|---|
| 2012/0087616 A1 | 4/2012 | Ichioka et al. | |
| 2017/0052424 A1 | 2/2017 | Iwatsuka et al. | |
| 2019/0271897 A1 | 9/2019 | Iwatsuka et al. | |
| 2020/0041824 A1 | 2/2020 | Ohmori et al. | |
| 2020/0081277 A1* | 3/2020 | Rohde ................ | H04B 10/5053 |
| 2020/0027020 A1 | 8/2020 | Ohmori et al. | |
| 2020/0271963 A1* | 8/2020 | Iwatsuka ............... | G02F 1/2255 |

FOREIGN PATENT DOCUMENTS

| | | |
|---|---|---|
| JP | 2012-078376 A | 4/2012 |
| JP | 2014-142411 A | 8/2014 |
| JP | 2015-014716 A | 1/2015 |
| JP | 2017-129834 A | 7/2017 |
| JP | 2019-179165 | 10/2019 |
| JP | 2020-020953 A | 2/2020 |
| JP | 2020-134875 A | 8/2020 |

\* cited by examiner

OPTICAL DEVICE AND OPTICAL TRANSCEIVER

CROSS-REFERENCE TO RELATED APPLICATION

This application is based upon and claims the benefit of priority of the prior Japanese Patent Application No. 2021-039733, filed on Mar. 11, 2021, the entire contents of which are incorporated herein by reference.

FIELD

The embodiment discussed herein is related to an optical device and an optical transceiver.

BACKGROUND

For example, in Japanese Laid-open Patent Publication No. 2020-20953 described below, a Mach-Zehnder optical modulator using lithium niobate ($LiNbO_3$; LN) is disclosed. With this type of optical modulator, a LN film is provided on a buffer layer, a buffer layer is provided on the LN film, and a signal electrode is provided on the buffer layer. Then, an optical waveguide having a ridge structure is formed on the LN film (i.e., thin film LN optical waveguide), and light propagating through inside the thin film LN optical waveguide is modulated by an electrical signal that is supplied via the signal electrode.

Incidentally, at both of the electrodes used for RF modulation and phase adjustment, the refractive index of the optical waveguide in an area in which each of the electrodes is present is changed by applying a voltage to each of the electrodes. As a result, the effective optical path length of a RF modulating unit and the effective optical path length of a phase adjustment unit are changed, and it is thus possible to perform phase modulation and adjust a phase difference. Furthermore, as the optical waveguide, it is conceivable to use a structure by providing a waveguide formed by using titanium (Ti) (i.e., a Ti diffusion optical waveguide) between the LN film and the buffer layer. However, there is a problem in that a loss in light is increased in the Ti diffusion optical waveguide because the light confinement effect in the Ti diffusion optical waveguide is lower than that in the thin film LN optical waveguide. In contrast, if an optical waveguide is changed from the Ti diffusion optical waveguide to the thin film LN optical waveguide, it is possible to increase an electric field application efficiency in the RF modulating unit, and it is thus possible to reduce the size of the RF electrode that is used to perform RF modulation. However, to obtain effective electric field application efficiency in the phase adjustment unit, there is a need to lengthen the DC electrode that is used for the phase adjustment. However, if the length of the DC electrode is increased, it is difficult to reduce the size of the optical modulator.

In contrast, in order to decrease driving power of the phase adjustment unit, it is conceivable to shorten the distance between the DC electrode and the ground electrode. However, there are some limitations to shorten the distance between the DC electrode and the ground electrode in view of a manufacturing error. Accordingly, it is difficult to further implement the electrical power saving by shortening the distance between the DC electrode and the ground electrode.

SUMMARY

According to an aspect of an embodiment, an optical device includes a substrate, a RF modulating unit, and phase adjustment unit. In the substrate, a first buffer layer, a thin film having an electro-optic effect, and a second buffer layer are formed in this order. The RF modulating unit is provided on the substrate and modulates light in accordance with a RF signal. The phase adjustment unit is provided on the substrate and adjusts a phase of an optical signal modulated by the RF modulating unit. The phase adjustment unit includes a first optical waveguide and a heater. The first optical waveguide is provided between the second buffer layer and the thin film, and is formed of a material having a thermo-optical effect. Light that has been modulated or that is to be modulated by the RF modulating unit is allowed to pass through the first optical waveguide. The heater is provided at a position opposite the first optical waveguide, with the second buffer layer therebetween, and heats the first optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments.

Configuration of Optical Transceiver 10

Figure 1:
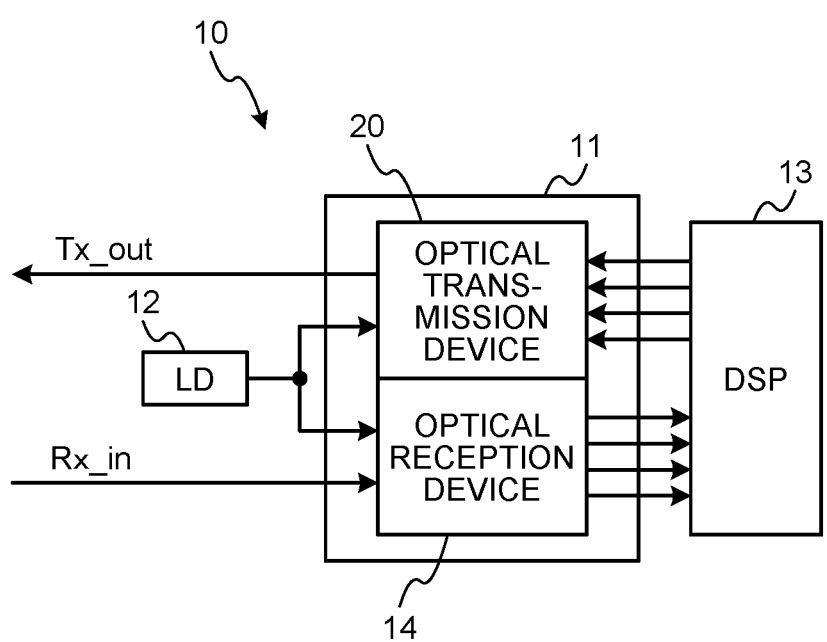
FIG. 1 is a diagram illustrating an example of an optical transceiver.

FIG. 1 is a diagram illustrating an example of an optical transceiver 10. The optical transceiver 10 according to the embodiment includes an optical transmission/reception unit 11, a laser diode (LD) 12, and a digital signal processor (DSP) 13. The optical transmission/reception unit 11 includes an optical transmission device 20 and an optical reception device 14. The optical transmission device 20 is an example of an optical device.

The optical transmission device 20 modulates light supplied from the LD 12 on the basis of a transmission signal that is output from the DSP 13. Then, the optical transmission device 20 outputs an optical signal (Tx_out) that is modulated in accordance with the transmission signal. The optical reception device 14 receives an optical signal (Rx_in). The received optical signal is subjected to polarization separation, is demodulated by using the light supplied from the LD 12, is converted to an electrical signal, and is then output to the DSP 13.

Configuration of Optical Transmission Device 20

Figure 2:
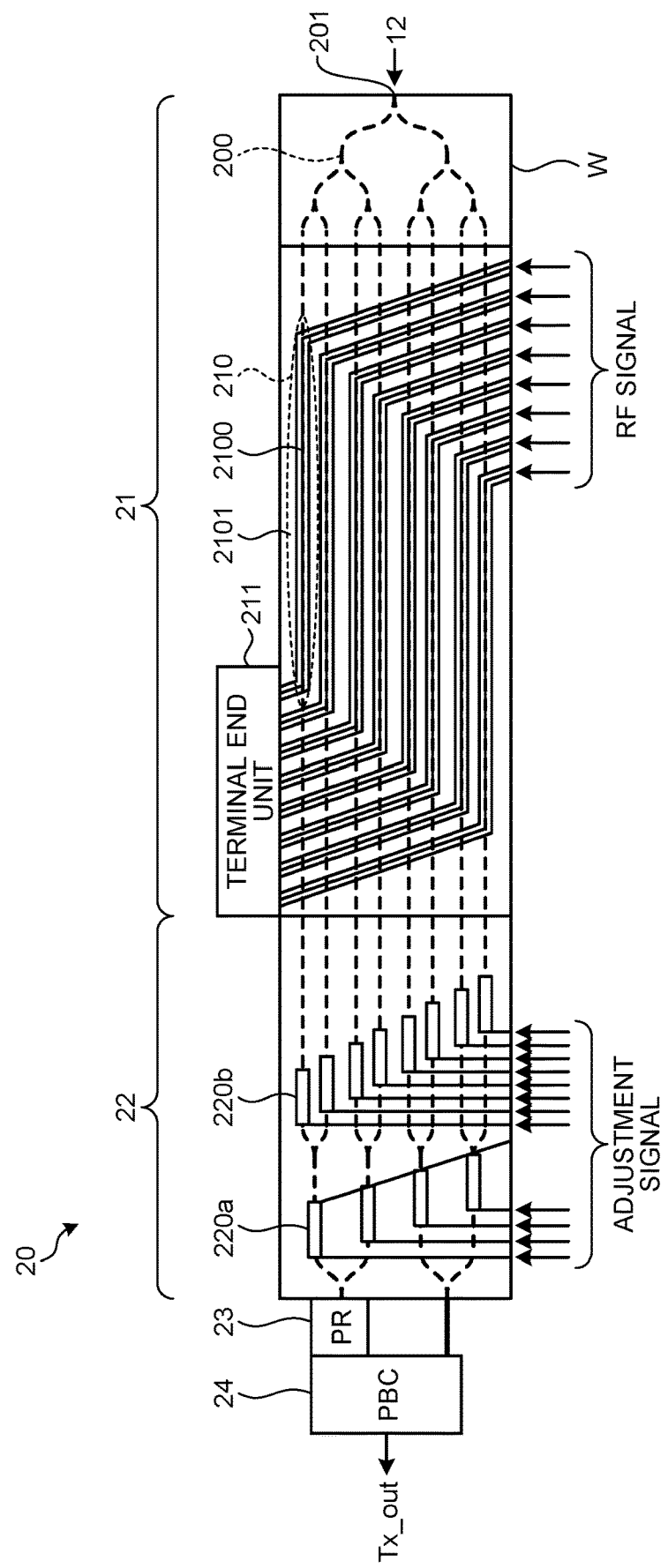
FIG. 2 is a diagram illustrating an example of an optical transmission device.

FIG. 2 is a diagram illustrating an example of the optical transmission device 20. The optical transmission device 20 includes a radio frequency (RF) modulation area 21, a phase adjustment area 22, a polarization rotator (PR) 23, and a polarization beam combiner (PBC) 24. The RF modulation area 21 and the phase adjustment area 22 are provided on a single substrate W. A plurality of RF modulating units 210, and a terminal end unit 211 are provided in the RF modulation area 21. Each of the RF modulating units 210 includes a signal electrode 2100 and a ground electrode 2101. In the embodiment, the plurality of RF modulating units 210 constitutes a Mach-Zehnder optical modulator. In the phase adjustment area 22, a plurality of phase adjustment units 220a and a plurality of phase adjustment units 220b are provided. Furthermore, in a description below, the plurality of phase adjustment units 220a and the plurality of phase adjustment units 220b are collectively referred to as a phase adjustment unit 220, if the phase adjustment units 220a and the phase adjustment units 220b do not need to be distinguished. By providing the plurality of RF modulating units 210 and the plurality phase adjustment units 220 on the single substrate W, it is possible to easily manufacture the optical transmission device 20.

An optical waveguide 200 that propagates light is formed on the substrate W. The light that is output from the LD 12 is input from an input end 201 of the optical waveguide 200, and is then input to each of the RF modulating units 210 via the optical waveguide 200. Each of the RF modulating units 210 modulates the input light in accordance with the RF signal that is input from the DSP 13.

An optical signal that has been modulated by each of the RF modulating units 210 is input to the respective phase adjustment units 220b. Each of the phase adjustment units 220b adjusts the phase of the optical signal in accordance with the adjustment signal that is input from the DSP 13. The optical signals whose phase has been adjusted by the respective phase adjustment units 220b are input to the respective phase adjustment units 220a. Each of the phase adjustment units 220a further adjusts the phase of the associated optical signal in accordance with the associated adjustment signal that is input from the DSP 13.

After the optical signals whose phase has been adjusted by some of the phase adjustment units 220a are combined, the PR 23 rotates a polarization plane of the combined optical signal. The optical signals whose phase has been adjusted by the other phase adjustment units 220a are combined, by the PBC 24, with the optical signal in which the polarization plane has been rotated by the PR 23, and is then output as an optical signal (Tx_out).

Configuration of RF Modulating Unit 210

Figure 3:
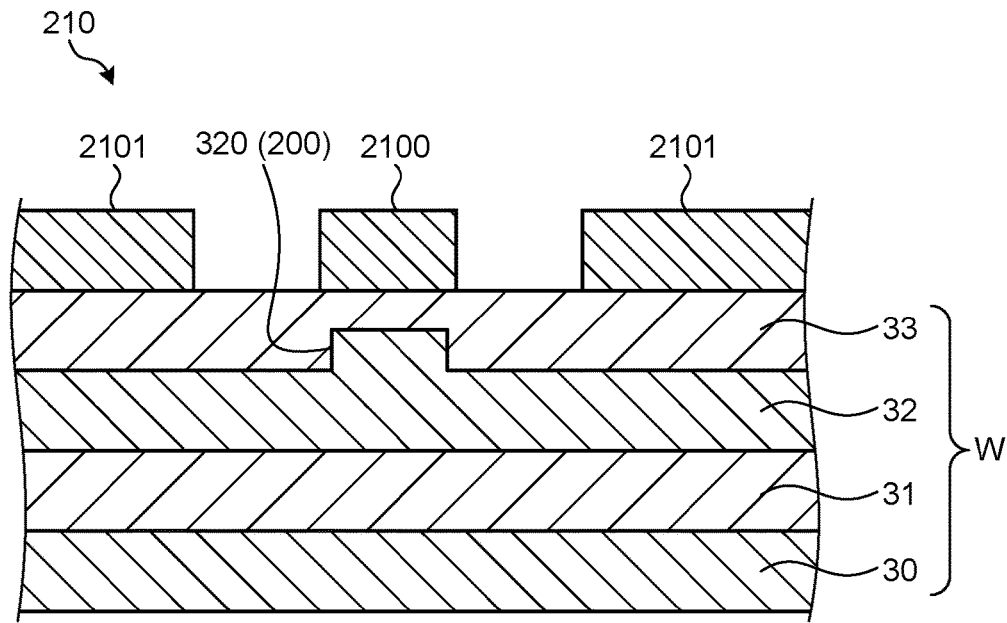
FIG. 3 is a sectional view illustrating an example of a RF modulating unit.

FIG. 3 is a sectional view illustrating an example of the RF modulating unit 210. The RF modulating unit 210 includes the signal electrode 2100 and the ground electrodes 2101 that are provided on the substrate W. In the embodiment, the signal electrode 2100 and the ground electrodes 2101 are formed of a material made of, for example, gold, silver, copper, or the like. The substrate W is a multi-layer substrate in which a support substrate 30, a buffer layer 31, a thin film LN substrate 32, and a buffer layer 33 are formed in this order. The support substrate 30 is made of, for example, single-crystal silicon or the like. The buffer layer 31 and the buffer layer 33 are formed of, for example, a silicon dioxide film or the like. The buffer layer 31 is an example of a first buffer layer, whereas the buffer layer 33 is an example of a second buffer layer. The thin film LN substrate 32 is formed by a thin film in which the refractive index of, for example, $LiNbO_3$ is large and that has an electro-optic effect. A ridge 320 that has a thickness that is larger than a thickness of the other area of the thin film LN substrate 32, and that is formed as a projected section along the surface of the thin film LN substrate 32 is provided on the thin film LN substrate 32. The ridge 320 functions as the optical waveguide 200 that propagates light. The thin film LN substrate 32 and the ridge 320 are formed of the same material. The refractive index of each of the thin film LN substrate 32 and the ridge 320 is larger than the refractive index of each of the buffer layer 31 and the buffer layer 33. The ridge 320 is an example of a second optical waveguide.

A RF signal having a band of, for example, several tens of gigahertz (GHz) is input from the DSP 13 to the signal electrode 2100. If the RF signal is input to the signal electrode 2100, an electric field is generated between the signal electrode 2100 and the ground electrode 2101. Then, the refractive index of the ridge 320 is changed caused by the electric field generated between the signal electrode 2100 and the ground electrode 2101. As a result, the phase of the light propagating through the ridge 320 is changed. The light is modulated in accordance with the RF signal by individually changing the phase of the light propagating through the ridge 320 in each of the RF modulating units 210.

Configuration of Phase Adjustment Unit 220

Figure 4:
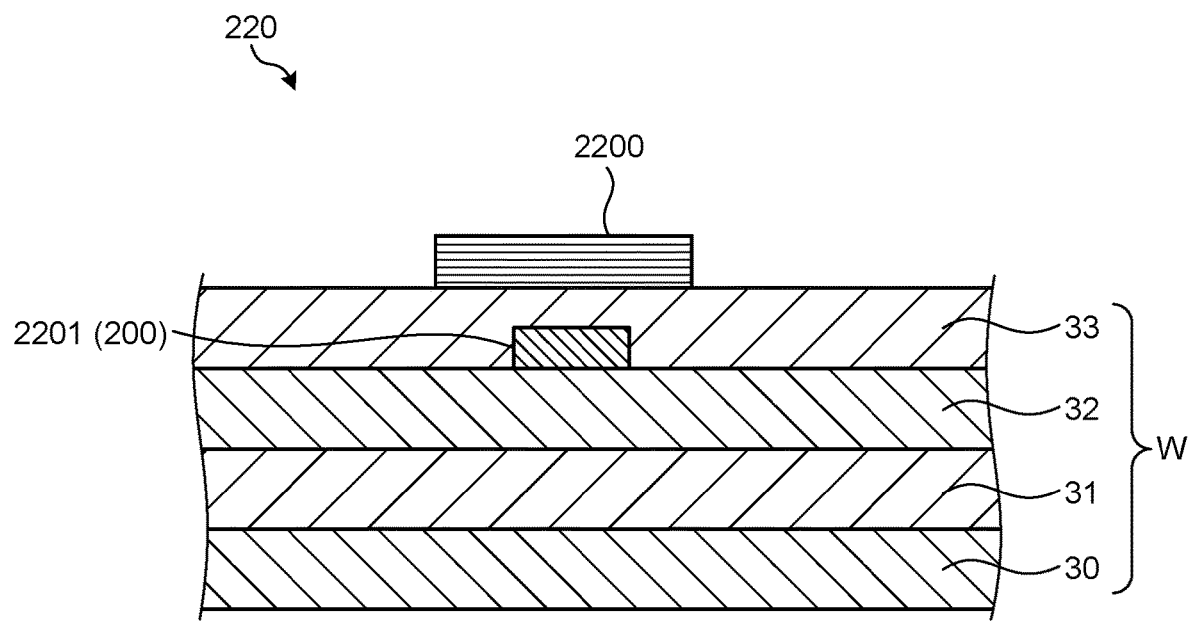
FIG. 4 is a sectional view illustrating an example of a phase adjustment unit.

FIG. 4 is a sectional view illustrating an example of the phase adjustment unit 220. The phase adjustment unit 220 includes a heater 2200 that is provided on the substrate W.

In the embodiment, the heater 2200 is made of, for example, titanium, titanium nitride, or the like, and is provided at a position opposite a to-be-heated optical waveguide 2201, with the buffer layer 33 therebetween. Furthermore, in the phase adjustment unit 220 according to the embodiment, the to-be-heated optical waveguide 2201 that is formed of a material exhibiting a large thermo-optical effect, which is larger than that of the thin film LN substrate 32, and that is provided between the heater 2200 and the thin film LN substrate 32. The to-be-heated optical waveguide 2201 is an example of a first optical waveguide. The material having the thermo-optical effect that is larger than that of the thin film LN substrate 32 is, for example, silicon, a polymer, or the like. An example of the polymer used may be, for example, a polyimide or a poly methyl methacrylate (PMMA) resin.

Figure 5:
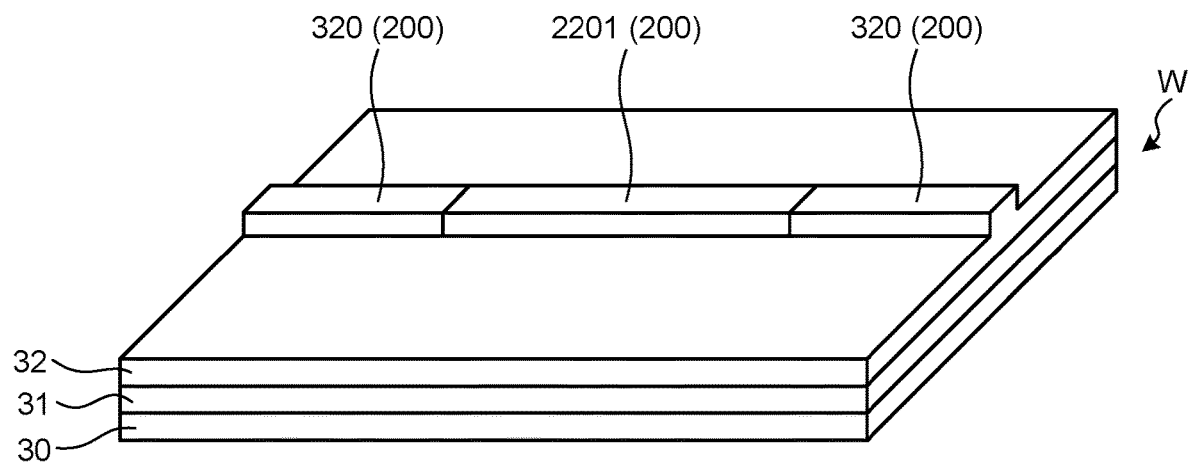
FIG. 5 is a diagram illustrating a structure of an optical waveguide in the phase adjustment unit.

FIG. 5 is a diagram illustrating an example of the structure of the optical waveguide 200 in the phase adjustment unit 220. Furthermore, in FIG. 5, the buffer layer 33 and the heater 2200 are not illustrated. In the embodiment, the to-be-heated optical waveguide 2201 is disposed on the thin film LN substrate 32 so as to continue in the extending direction of the ridge 320. Furthermore, in the embodiment, the to-be-heated optical waveguide 2201 is disposed on the thin film LN substrate 32 such that the end surface of the to-be-heated optical waveguide 2201 in the extending direction of the to-be-heated optical waveguide 2201 is in contact with the end surface of the ridge 320 in the extending direction of the ridge 320. The refractive index of the to-be-heated optical waveguide 2201 is larger than the refractive index of each of the thin film LN substrate 32 and the buffer layer 33. Consequently, the light propagating through the ridge 320 enters the to-be-heated optical waveguide 2201.

Furthermore, the thermo-optical effect exhibited in the to-be-heated optical waveguide 2201 is larger than the thermo-optical effect exhibited in each of the thin film LN substrate 32 and the ridge 320. The thermo-optical effect mentioned here is the rate of change of the refractive index with respect to a change of temperature, and, in a case where the thermo-optical effect is large, this state indicates that the rate of change of the refractive index with respect to a change of temperature is large.

The heater 2200 generates heat in accordance with the size of the adjustment signal that is input from the DSP 13. The to-be-heated optical waveguide 2201 is heated, by way of the buffer layer 33, by the heat generated from the heater 2200, and the refractive index of the to-be-heated optical waveguide 2201 is changed. Consequently, the phase of the light propagating through the ridge 320 is changed. The phase of the optical signal is individually adjusted by individually change the phase of the light propagating through the to-be-heated optical waveguide 2201 in each of the phase adjustment units 220. In the embodiment, a material, such as titanium, that has high heat generation efficiency is used for the heater 2200, and a material, such as silicon, that exhibits high thermo-optical effect is used for the to-be-heated optical waveguide 2201, so that it is possible to adjust the phase of light by using low electrical power.

Method of Forming Optical Waveguide 200 in Phase Adjustment Unit 220

In the following, an example of a method of forming the optical waveguide 200 in the phase adjustment unit 220 will be described with reference to FIG. 6 to FIG. 9. FIGS. 6 to 9 are diagrams each illustrating an example of a manufacturing process of the optical waveguide 200 in the phase adjustment unit 220.

Figure 6:
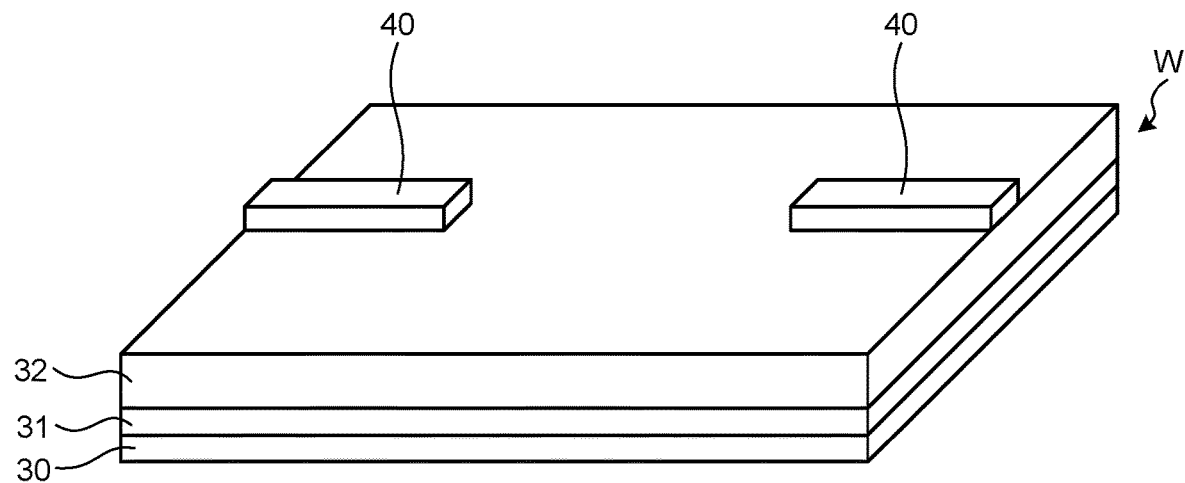
FIG. 6 is a diagram illustrating an example of a manufacturing process of the optical waveguide in the phase adjustment unit.
Figure 7:
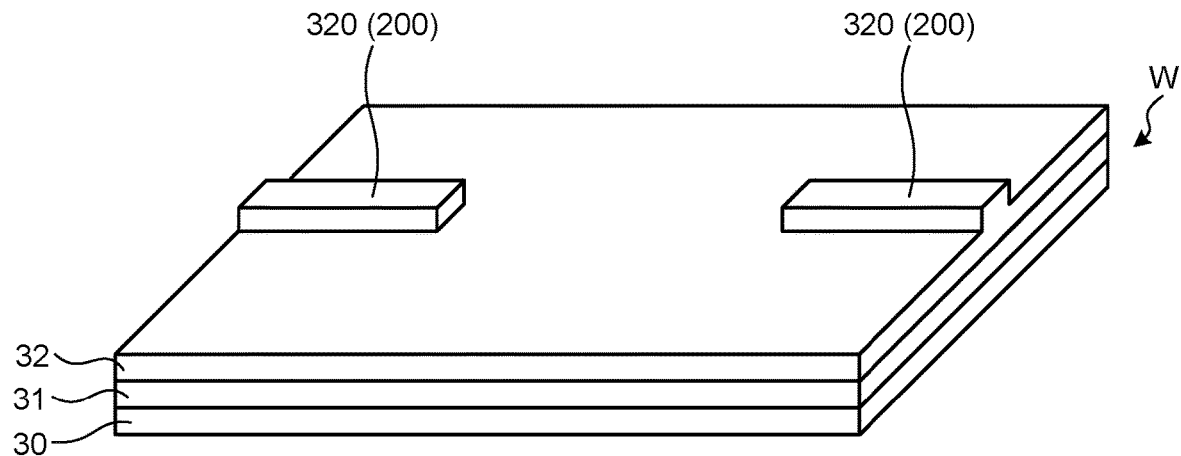
FIG. 7 is a diagram illustrating an example of the manufacturing process the optical waveguide in the phase adjustment unit.

First, for example, as illustrated in FIG. 6, on the substrate W in which the support substrate 30, the buffer layer 31, and the thin film LN substrate 32 are formed, a mask 40 is disposed at the position of the ridge 320. Then, the thin film LN substrate 32 is etched at a portion other than the portion in which the mask 40 is disposed, and then, the mask 40 is removed. Consequently, for example, as illustrated in FIG. 7, the ridge 320 is formed at the position at which the mask 40 is disposed.

Figure 8:
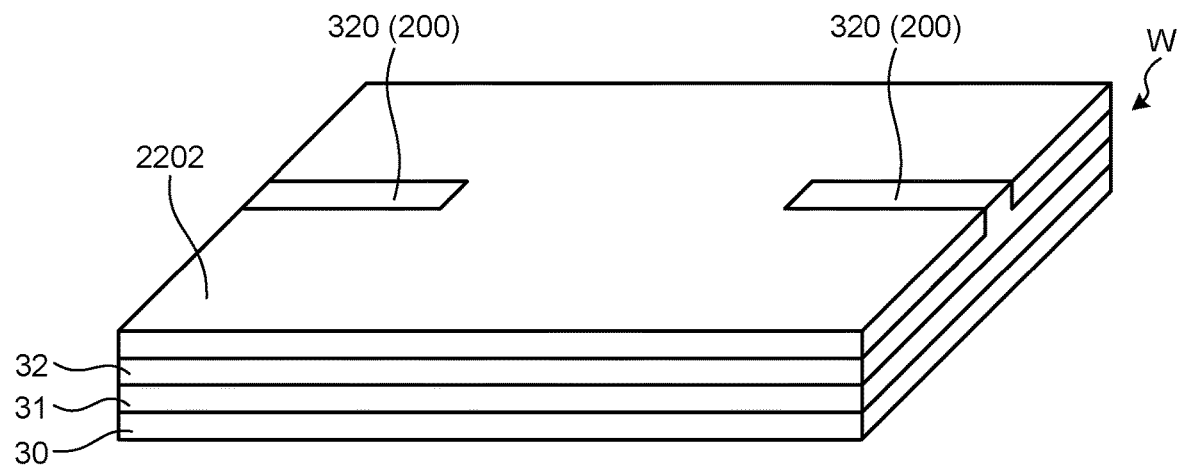
FIG. 8 is a diagram illustrating an example of the manufacturing process the optical waveguide in the phase adjustment unit.
Figure 9:
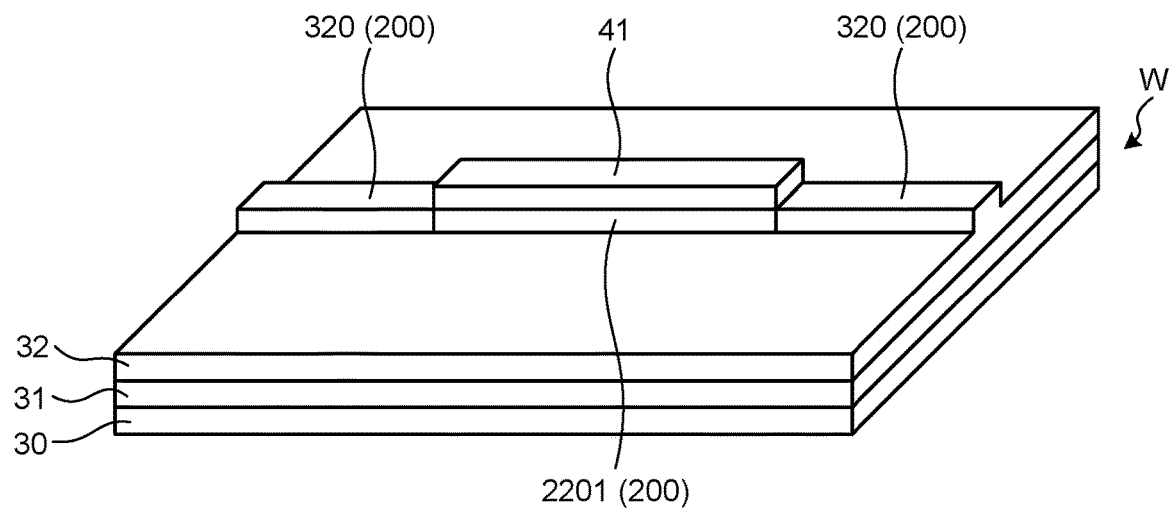
FIG. 9 is a diagram illustrating an example of the manufacturing process the optical waveguide in the phase adjustment unit.

Then, on the thin film LN substrate 32, a film 2202 formed of the same material as the to-be-heated optical waveguide 2201 is formed. Then, for example, as illustrated in FIG. 8, the film 2202 is polished until the ridge 320 is exposed. Then, a mask 41 is disposed at the position, on the film 2202, at which the to-be-heated optical waveguide 2201 is formed. Then, the film 2202 is etched, and the film 2202 is etched until the thin film LN substrate 32 that is a lower layer of the film 2202 is exposed under the processing condition that the mask 41 and the thin film LN substrate 32 are not etched. Consequently, for example, as illustrated in FIG. 9, the to-be-heated optical waveguide 2201 is formed between the mask 41 and the thin film LN substrate 32. Then, the optical waveguide 200 illustrated in, for example, FIG. 5 is formed by removing the mask 41.

With the optical transmission device 20 according to the embodiment, a material, such as titanium, that exhibits large heat generation efficiency is used for the heater 2200, and a material, such as silicon, that exhibits large thermo-optical effect is used for the to-be-heated optical waveguide 2201. As a result, it is possible to implement, at the same time, a reduction in size of the optical transmission device 20 and the electrical power saving in phase adjustment.

Effect of Embodiments

As is clear from the above description, the optical transmission device 20 according to the embodiment includes the substrate W, the RF modulating unit 210, and the phase adjustment unit 220. The substrate W is formed such that the buffer layer 31, the thin film LN substrate 32, and the buffer layer 33 are formed in this order. The RF modulating unit 210 is provided on the substrate W and modulates light in accordance with a RF signal. The phase adjustment unit 220 is provided on the same substrate W on which the RF modulating unit 210 is provided, and adjusts the phase of the optical signal that has been modulated by the RF modulating unit 210. The phase adjustment unit 220 includes the heater 2200 and the to-be-heated optical waveguide 2201. The to-be-heated optical waveguide 2201 is provided between the thin film LN substrate 32 and the buffer layer 33, and through which the optical signal modulated by the RF modulating unit 210 is allowed to pass. Furthermore, the to-be-heated optical waveguide 2201 is formed of a material having a thermo-optical effect. The heater 2200 is provided at a position opposite the to-be-heated optical waveguide 2201, with the buffer layer 33 therebetween, and heats the to-be-heated optical waveguide 2201.

By applying a voltage to the electrode of each of the RF modulating unit 210 and the phase adjustment unit 220, it is possible to change the refractive index of each of the optical waveguides located in the area in which the electrodes are present. As a result, the effective optical path length of the optical waveguide is changed, and it is thus possible to perform phase modulation and adjust a phase difference. The thin film LN optical waveguide formed of a LN thin film has the characteristics indicating that the electro-optic effect is high, and also, the electric field application efficiency due to RF modulation is high. Accordingly, it is possible to reduce the size of the RF modulating unit. However, with the phase adjustment unit formed of the LN thin film, it is difficult to reduce electrical power consumption, and it is thus difficult to improve the electric field application efficiency. Therefore, in the embodiment, regarding the phase adjustment unit 220, the to-be-heated optical waveguide 2201 that is formed of a material having the thermo-optical effect is used instead of using a LN thin film while taking advantage of the thin film LN optical waveguide. As a result, it is possible to implement electrical power saving of the optical transmission device 20.

Furthermore, if the thin film LN optical waveguide is used, the electric field application efficiency is able to be increased in the RF modulating unit 210, so that it is possible to reduce the size of the signal electrode 2100 that is used to perform RF modulation. However, in the phase adjustment unit 220, in order to obtain effective electric field application efficiency, the length of the DC electrode used for the phase adjustment needs to be increased. Thus, in the embodiment, regarding the phase adjustment unit 220, the to-be-heated optical waveguide 2201 that is formed of a material having the thermo-optical effect is used instead of using a LN thin film. The length of the DC electrode of the phase adjustment unit in a case where the thin film LN optical waveguide is used is, for example, 5 to 20 mm, whereas the length of the heater 2200 according to the embodiment using the to-be-heated optical waveguide 2201 is able to be reduced up to, for example, 0.5 to 5 mm. Consequently, it is possible to reduce the size of the optical transmission device 20.

As described above, in the optical transmission device 20 according to the embodiment, the phase adjustment performed by the phase adjustment unit 220 is implemented by using the thermo-optical effect instead of using the electro-optic effect, so that it is possible to implement a reduction in electrical power consumption and a reduction in size of the optical transmission device 20. Furthermore, the phase adjustment performed by the phase adjustment unit 220 according to the embodiment is implemented by the thermo-optical effect instead of using the electro-optic effect, it is possible to prevent a DC drift and it is thus also possible to implement long-term reliability.

Furthermore, in the embodiment described above, the ridge 320 that is a projected section is formed on the thin film LN substrate 32, and an optical signal propagating through the ridge 320 is modulated in the RF modulating unit 210. In the phase adjustment unit 220, instead of the ridge 320, the to-be-heated optical waveguide 2201 is disposed so as to continue in the extending direction of the ridge 320. The end surface of the to-be-heated optical waveguide 2201 in the extending direction of the to-be-heated optical waveguide 2201 is in contact with the end surface of the ridge 320 in the extending direction of the ridge 320. Consequently, it is possible to reduce a loss at the time at which the optical signal propagates from the ridge 320 to the to-be-heated optical waveguide 2201 and a loss at the time at which the optical signal propagates from the to-be-heated optical waveguide 2201 to the ridge 320.

Furthermore, in the embodiment described above, the thermo-optical effect of the to-be-heated optical waveguide 2201 is larger than that of the ridge 320. Consequently, it is possible to adjust the phase of light by using low electrical power.

Furthermore, in the embodiment described above, the refractive index of the to-be-heated optical waveguide 2201 is larger than the refractive index of the thin film LN substrate 32. Consequently, a larger amount of the optical signal enters the to-be-heated optical waveguide 2201, and it is thus possible to efficiently change the phase of the optical signal.

Others

In addition, the disclosed technology is not limited to each of the embodiments described above and various modifications are possible as long as they do not depart from the spirit of the disclosed technology.

Figure 10:
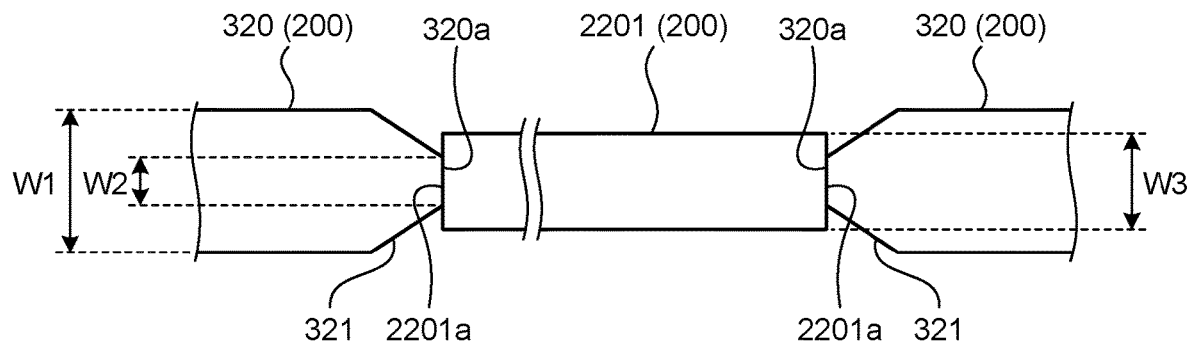
FIG. 10 is a diagram illustrating another example of a structure of the optical waveguide in the phase adjustment unit.

For example, in the embodiment described above, at a portion at which each of the ridges 320 is in contact with the to-be-heated optical waveguide 2201, the width of the ridge 320 and the width of the to-be-heated optical waveguide 2201 are substantially the same; however, the disclosed technology is not limited to this. For example, as illustrated in FIG. 10, in the phase adjustment unit 220, a width of end portions 321 of the respective ridges 320 in the extending direction of the corresponding ridges 320 may be narrower from a width W1 toward a width W2 as the end portions 321 of the respective ridges 320 are closer to respective end surfaces 320a of the respective ridges 320 that are in contact with the to-be-heated optical waveguide 2201. FIG. 10 is a diagram illustrating another example of the structure of the optical waveguide 200 in the phase adjustment unit 220. FIG. 10 schematically illustrates the structure of the optical waveguide 200 in a case where the optical waveguide 200 in the phase adjustment unit 220 is viewed from a position opposite the thin film LN substrate 32. In the example illustrated in FIG. 1, the width W2 of the end surfaces 320a of the respective ridges 320 that are in contact with the to-be-heated optical waveguide 2201 is narrower than a width W3 of an end surfaces 2201a of the to-be-heated optical waveguide 2201 that is in contact with the ridges 320.

The refractive index of the to-be-heated optical waveguide 2201 is larger than the refractive index of the ridge 320, so that a mode field of light in the to-be-heated optical waveguide 2201 is narrower than a mode field of light in the ridge 320. Therefore, at the portion at which the ridge 320 is in contact with the to-be-heated optical waveguide 2201, by narrowing the width of the ridge 320, it is possible to prevent the optical signal that enters the to-be-heated optical waveguide 2201 from the ridge 320 from being changed to a multimode inside the to-be-heated optical waveguide 2201. Furthermore, at the portion at which the optical signal entering the ridge 320 from the to-be-heated optical waveguide 2201, the width of the ridge 320 is gradually increased, so that it is possible to prevent a loss at the time at which the optical signal enters the ridge 320 from the to-be-heated optical waveguide 2201 and it is thus possible to further efficiently propagates the optical signal.

Figure 11:
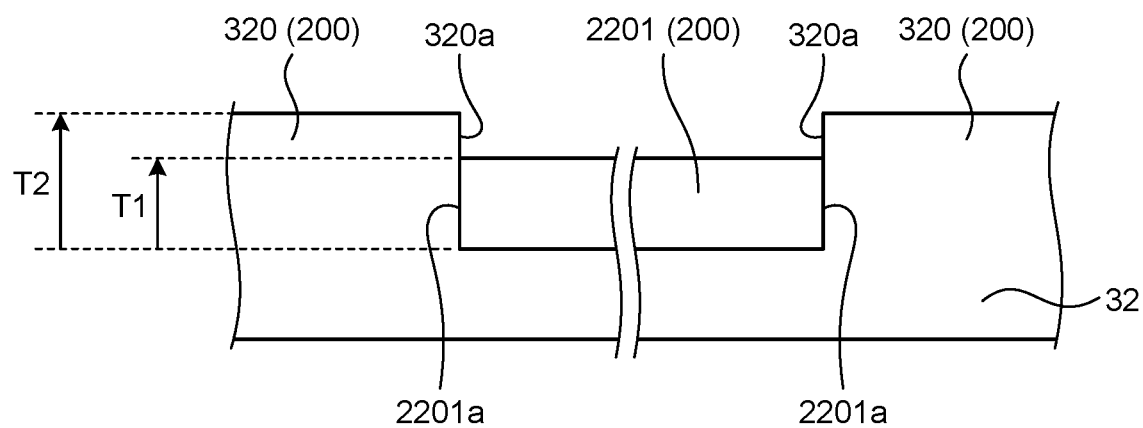
FIG. 11 is a diagram illustrating another example of a structure of the optical waveguide in the phase adjustment unit.

Furthermore, in the embodiment described above, at the portion at which the ridge 320 is in contact with the to-be-heated optical waveguide 2201, the thickness of the ridge 320 and the thickness of the to-be-heated optical waveguide 2201 are substantially the same; however, the disclosed technology is not limited to this. For example, as illustrated in FIG. 11, in the phase adjustment unit 220, a thickness T1 of the to-be-heated optical waveguide 2201 may be thinner than a thickness T2 of the ridge 320. FIG. 11 is a diagram illustrating another example of the structure of the optical waveguide 200 in the phase adjustment unit 220. FIG. 11 schematically illustrates the structure of the optical waveguide 200 in a case where the optical waveguide 200 is viewed from the direction parallel to the surface of the thin film LN substrate 32. Consequently, it is possible to prevent the optical signal from being changed to a multimode at the time at which the optical signal propagates through the to-be-heated optical waveguide 2201.

Figure 12:
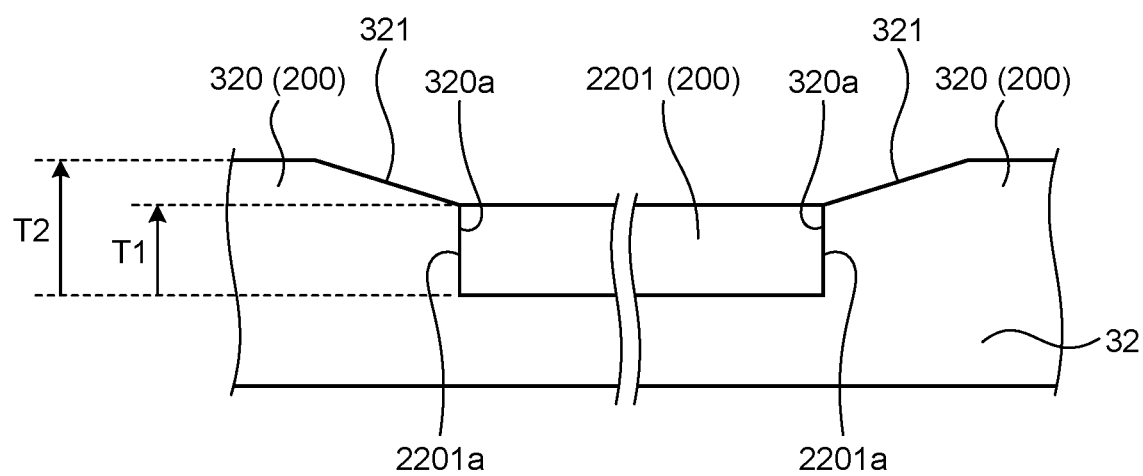
FIG. 12 is a diagram illustrating another example of a structure of the optical waveguide in the phase adjustment unit.

Furthermore, in the phase adjustment unit 220, the end portions 321 of the respective ridges 320 in the extending direction of the corresponding ridge 320 may be, for example, as illustrated in FIG. 12, gradually thinner from the thickness T2 toward the thickness T1 as the end portions 321 of the respective ridges 320 are closer to the respective end surfaces 320a that are in contact with the to-be-heated optical waveguide 2201. FIG. 12 is a diagram illustrating another example of the structure of the optical waveguide 200 in the phase adjustment unit 220. FIG. 12 schematically illustrates the structure of the optical waveguide 200 in a case where the optical waveguide 200 is viewed from a direction parallel to the surface of the thin film LN substrate 32. Consequently, it is possible for the optical signal inside the ridge 320 to further efficiently enter the to-be-heated optical waveguide 2201.

Furthermore, in the example illustrated in FIG. 12, a thickness of the end portions 321 of the respective ridges 320 in the extending direction of the corresponding ridges 320 may be thinner than the thickness T1 as the end portions 321 of the respective ridges 320 are closer to the respective end surfaces 320a that are in contact with the to-be-heated optical waveguide 2201. Consequently, it is possible to prevent the optical signal that enters the to-be-heated optical waveguide 2201 from the ridge 320 from being changed to a multimode inside the to-be-heated optical waveguide 2201. Furthermore, in addition to the structure illustrated in FIG. 12, in the width direction of the optical waveguide 200, the end portions 321 of the respective ridges 320 in the extending direction of the corresponding ridges 320 may be configured as illustrated in, for example, FIG. 10. Namely, the width of the end surfaces 320a of the respective ridges 320 that are in contact with the to-be-heated optical waveguide 2201 may be configured to be narrower than the width of the end surfaces of the to-be-heated optical waveguide 2201 that is in contact with the ridge 320.

Figure 13:
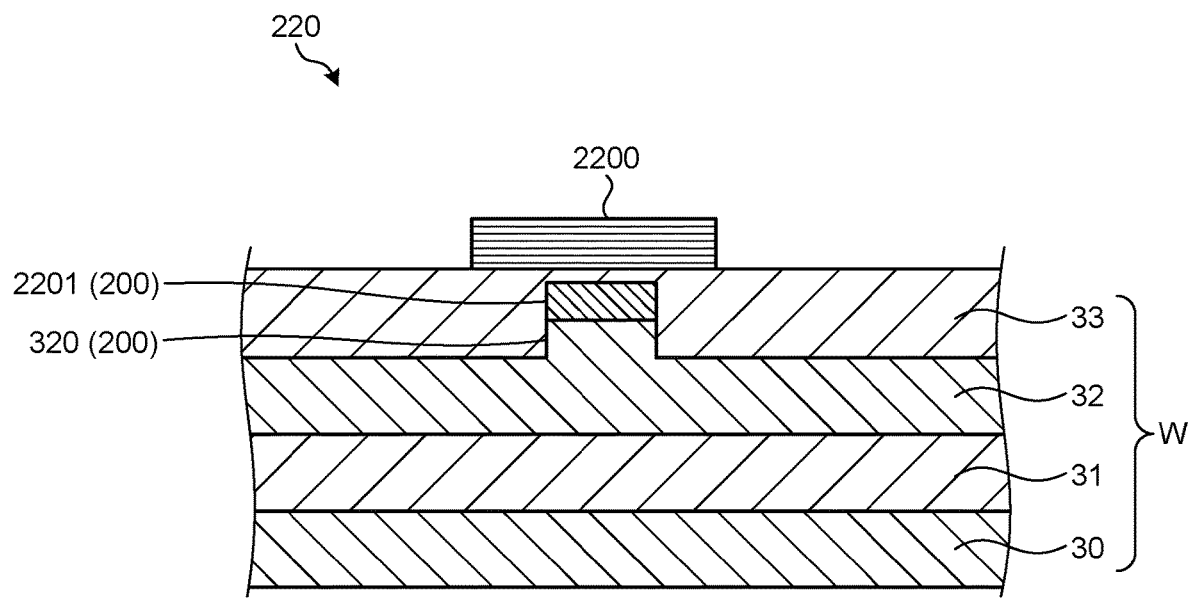
FIG. 13 is a diagram illustrating another example of a structure of the optical waveguide in the phase adjustment unit.

Furthermore, in the embodiment described above, the to-be-heated optical waveguide 2201 is disposed so as to continue in the extending direction of the ridge 320, and the end surface of the to-be-heated optical waveguide 2201 in the extending direction of the to-be-heated optical waveguide 2201 is in contact with the end surface of the ridge 320 in the extending direction of the ridge 320. However, the disclosed technology is not limited to this. As another example, for example, as illustrated in FIG. 13, the to-be-heated optical waveguide 2201 may be provided between the ridge 320 and the heater 2200. FIG. 13 is a sectional view illustrating another example of the phase adjustment unit 220. Even if this configuration is used, the optical signal that has propagated through the ridge 320 enters, at the boundary between the ridge 320 and the to-be-heated optical waveguide 2201, the to-be-heated optical waveguide 2201 in which the refractive index is larger than that of the ridge 320. Consequently, it is possible to change the phase of the optical signal propagating through the to-be-heated optical waveguide 2201 due to heat from the heater 2200.

The optical waveguide 200 having the configuration illustrated in FIG. 13 is able to be formed in accordance with procedures illustrated in, for example, FIG. 14 to FIG. 17. FIG. 14 to FIG. 17 are diagrams each illustrating a manufacturing process of the optical waveguide 200 in the phase adjustment unit 220.

Figure 14:
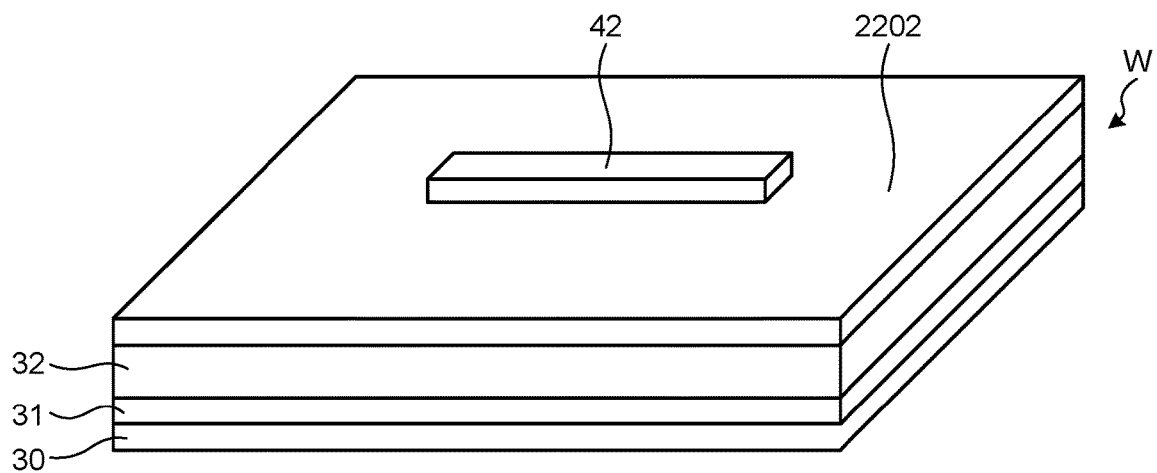
FIG. 14 is a diagram illustrating an example of the manufacturing process the optical waveguide in the phase adjustment unit.
Figure 15:
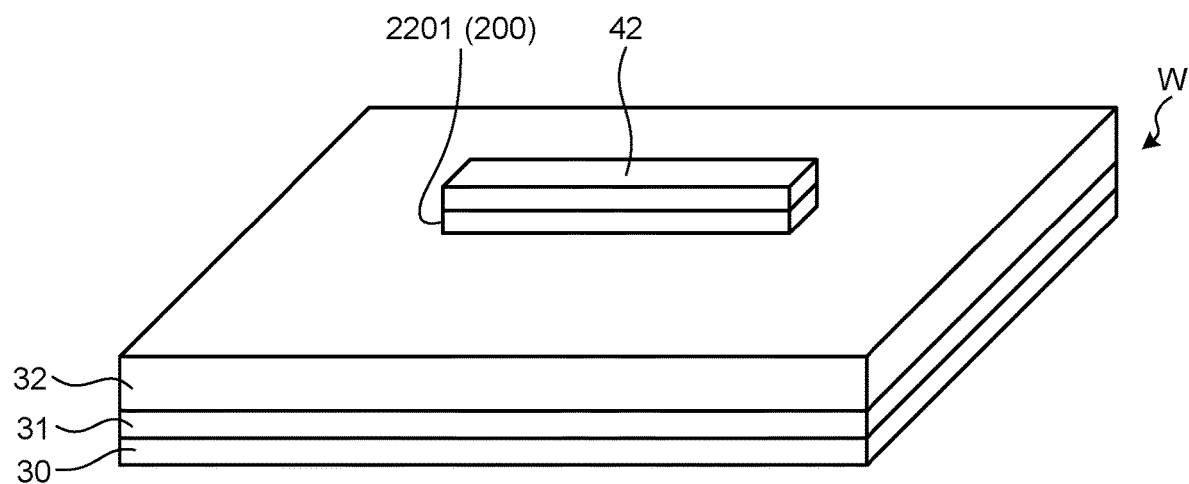
FIG. 15 is a diagram illustrating an example of the manufacturing process the optical waveguide in the phase adjustment unit.

First, for example, as illustrated in FIG. 14, on the substrate W in which the support substrate 30, the buffer layer 31, and the thin film LN substrate 32 are formed, the film 2202 formed of the same material as the to-be-heated optical waveguide 2201 is formed. Then, a mask 42 is disposed at the position of the to-be-heated optical waveguide 2201. Then, the film 2202 is etched at a portion other than the portion in which the mask 42 is disposed. Consequently, for example, as illustrated in FIG. 15, the to-be-heated optical waveguide 2201 is formed at the position of the mask 42. Then, the mask 42 is removed.

Figure 16:
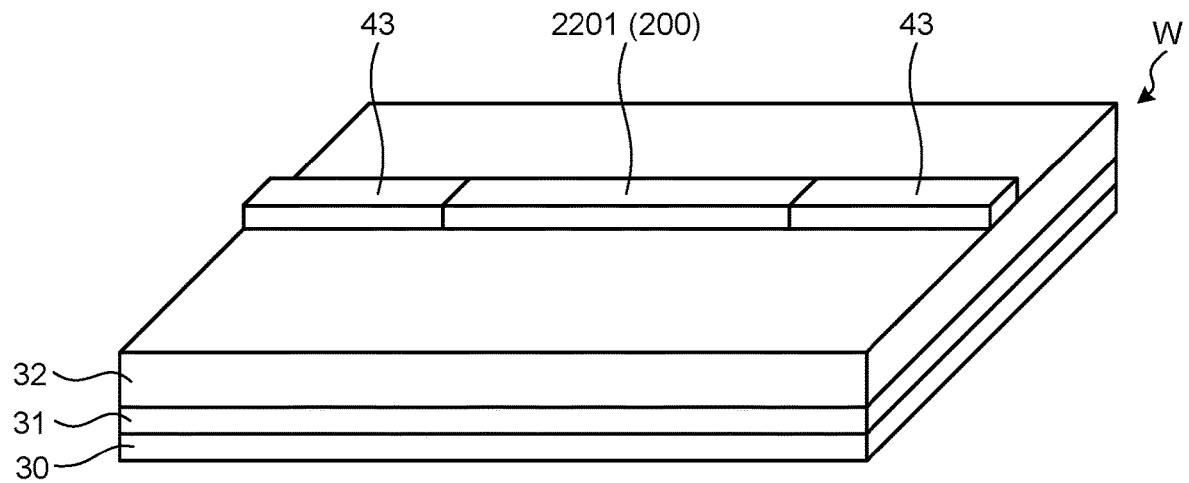
FIG. 16 is a diagram illustrating an example of the manufacturing process the optical waveguide in the phase adjustment unit.
Figure 17:
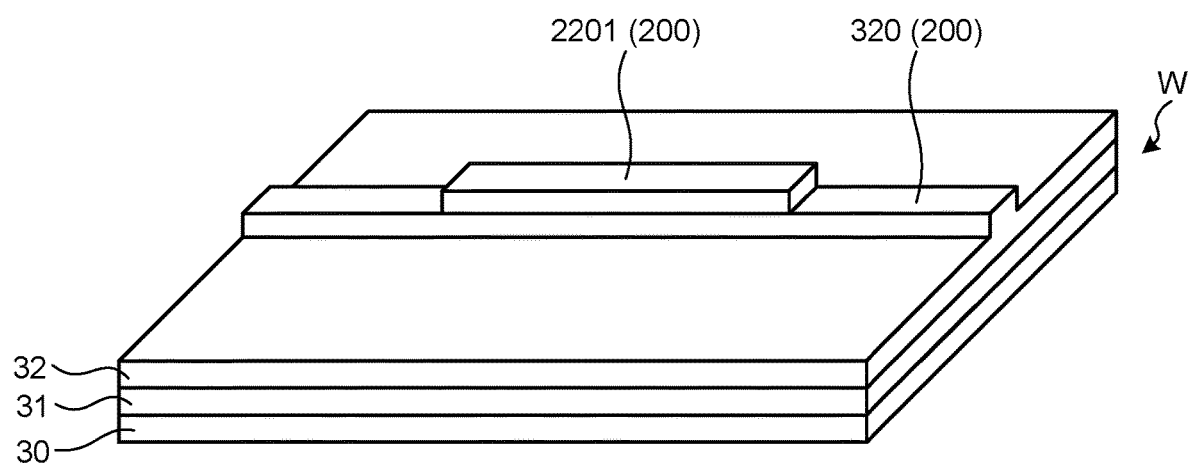
FIG. 17 is a diagram illustrating an example of the manufacturing process the optical waveguide in the phase adjustment unit.

In the following, for example, as illustrated in FIG. 16, a mask 43 is disposed at the position of the ridge 320. Then, the thin film LN substrate 32 is etched, and then, the thin film LN substrate 32 is etched under the processing condition that the mask 43 and the to-be-heated optical waveguide 2201 are not etched. Then, the mask 43 is removed. Consequently, for example, as illustrated in FIG. 17, the optical waveguide 200 in which the to-be-heated optical waveguide 2201 is disposed on the ridge 320 is formed. In the manufacturing process of the optical waveguide 200 illustrated as an example in FIG. 17, since the substrate W need not be polished, it is possible to reduce the manufacturing step as compared to that of the optical waveguide 200 according to the embodiment illustrated in, for example, FIG. 5.

Figure 18:
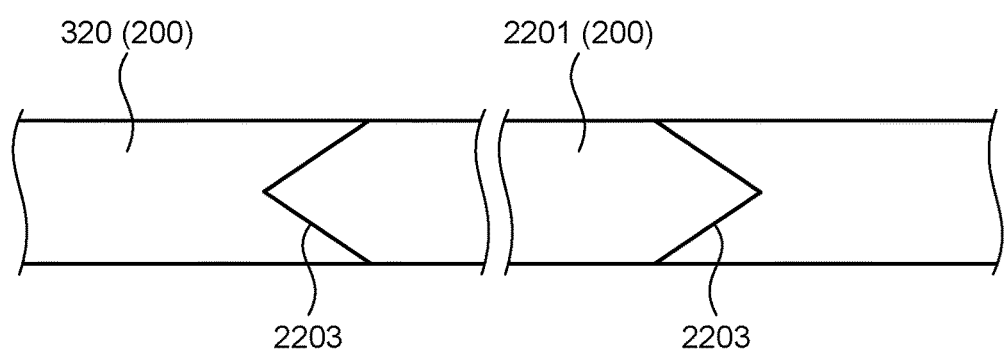
FIG. 18 is a diagram illustrating another example of a structure of the optical waveguide in the phase adjustment unit.

In addition, in the optical waveguide 200 illustrated as examples in FIG. 13 and FIG. 17, as illustrated in, for example, FIG. 18, the width of end portions 2203 of the to-be-heated optical waveguide 2201 in the extending direction of the to-be-heated optical waveguide 2201 may be narrower as the end portions 2203 are closer to the distal ends of the to-be-heated optical waveguide 2201. Consequently, it is possible to alleviate a rapid change in the refractive index at the time at which the optical signal enters the to-be-heated optical waveguide 2201 from the ridge 320 and at the time at which the optical signal enters the ridge 320 from the to-be-heated optical waveguide 2201. Consequently, it is possible to reduce a coupling loss in light generated at the boundary between the to-be-heated optical waveguide 2201 and the ridge 320.

Figure 19:
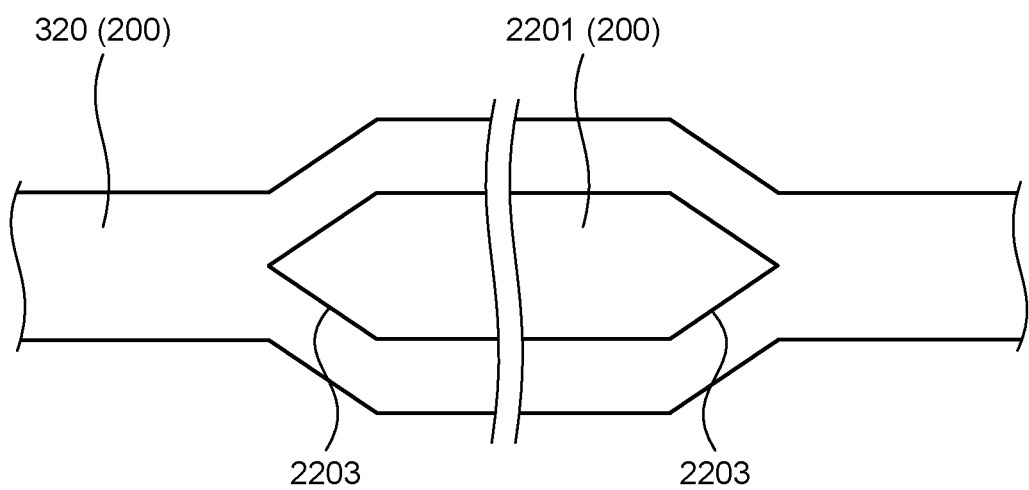
FIG. 19 is a diagram illustrating another example of a structure of the optical waveguide in the phase adjustment unit.

Furthermore, in the optical waveguide 200 illustrated as an example in FIG. 18, the width of the ridge 320 at the portion at which the to-be-heated optical waveguide 2201 is provided may be, as illustrated in, for example, FIG. 19, wider than the width of the ridge 320 at the portion at which the to-be-heated optical waveguide 2201 is not provided. Consequently, it is possible for the optical signal that propagates through the ridge 320 to efficiently enter the to-be-heated optical waveguide 2201. Furthermore, the width of the ridge 320 at the portion at which the to-be-heated optical waveguide 2201 is provided may be narrower toward the position that is associated with the distal ends of the to-be-heated optical waveguide 2201 in the extending direction of the to-be-heated optical waveguide 2201. Consequently, it is possible to prevent the optical signal that propagates through the ridge 320 from being changed to a multimode caused by a rapid change in width of the ridge 320.

According to an aspect of one embodiment, it is possible to reduce the size of the optical device while implementing electrical power saving.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical device comprising:
a substrate in which a first buffer layer, a thin film having an electro-optic effect and including a second optical waveguide, and a second buffer layer are formed in this order;
a RF modulating unit that is provided on the substrate and that modulates light propagating through the second optical waveguide in accordance with a RF signal, the second optical waveguide having an electro-optic effect; and
a phase adjustment unit that is provided on the substrate and that adjusts a phase of an optical signal modulated by the RF modulating unit, wherein
the phase adjustment unit includes
a first optical waveguide that is provided between the second buffer layer and the thin film, that is formed of a material having a thermo-optical effect, and through which light that has been modulated or that is to be modulated by the RF modulating unit is allowed to pass, and
a heater that is provided at a position opposite the first optical waveguide, with the second buffer layer therebetween, and that heats the first optical waveguide.

2. The optical device according to claim 1, wherein
the second optical waveguide is formed as a projected section,
the RF modulating unit modulates the optical signal propagating through the second optical waveguide,
the first optical waveguide is disposed so as to continue in an extending direction of the second optical waveguide, and
an end surface of the first optical waveguide in an extending direction of the first optical waveguide is in contact with an end surface of the second optical waveguide in the extending direction of the second optical waveguide.

3. The optical device according to claim 2, wherein the thermo-optical effect of the first optical waveguide is larger than the electro-optic effect of the second optical waveguide.

4. The optical device according to claim 1, wherein a refractive index of the first optical waveguide is larger than a refractive index of the thin film.

5. The optical device according to claim 2, wherein
a width of an end portion of the second optical waveguide in the extending direction of the second optical waveguide is narrower as the end portion of the second optical waveguide is closer to the end surface of the second optical waveguide that is in contact with the first optical waveguide, and
the width of the end surface of the second optical waveguide that is in contact with the first optical waveguide is narrower than a width of the end surface of the first optical waveguide that is in contact with the second optical waveguide.

6. The optical device according to claim 2, wherein
a thickness of the first optical waveguide is thinner than a thickness of the second optical waveguide.

7. The optical device according to claim 1, further comprising a second optical waveguide that is a projected section is formed on the thin film, wherein
the RF modulating unit modulates the optical signal propagating through the second optical waveguide, and
the first optical waveguide is provided between the second optical waveguide and the heater.

8. The optical device according to claim 7, wherein
a width of an end portion of the first optical waveguide in an extending direction of the first optical waveguide is narrower as the end portion of the first optical waveguide is closer to a leading end of the first optical waveguide.

9. The optical device according to claim 8, wherein
a width of a second optical waveguide at a portion in which the first optical waveguide is provided is wider than a width of the second optical waveguide at a portion in which the first optical waveguide is not provided.

10. The optical device according to claim 9, wherein
the width of the second optical waveguide at the portion in which the first optical waveguide is provided is gradually narrower toward a position that is associated with the leading end of the first optical waveguide in the extending direction of the first optical waveguide.

11. An optical transceiver comprising:
the optical device according to claim 1 that functions as an optical transmission device that transmits the optical signal modulated in accordance with the RF signal; and
an optical reception device that receives the optical signal and that outputs an electrical signal according to the received optical signal.

* * * * *